United States Patent
Wolfer

(10) Patent No.: US 6,362,299 B1
(45) Date of Patent: Mar. 26, 2002

(54) COMBINATION CROSSLINKING AGENT FOR VULCANIZATION OF SILICONE RUBBER UNDER NORMAL PRESSURE

(75) Inventor: Dietrich Wolfer, Oberndorf (AT)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/439,566

(22) Filed: Nov. 12, 1999

(30) Foreign Application Priority Data

Nov. 19, 1998 (DE) .......................... 198 53 488
Feb. 11, 1999 (DE) .......................... 199 05 767

(51) Int. Cl.⁷ .............................. C08G 77/06
(52) U.S. Cl. ................................ 528/24; 528/32
(58) Field of Search .................... 528/24, 32

(56) References Cited

U.S. PATENT DOCUMENTS

| | | |
|---|---|---|
| 4,260,536 A | 4/1981 | Yonezawa et al. |
| 4,743,671 A | 5/1988 | Dorn et al. |
| 5,057,151 A | 10/1991 | Schuster et al. |
| 5,120,385 A | 6/1992 | Takahashi et al. |
| 5,705,588 A * | 1/1998 | Kreis et al. |
| 5,973,058 A * | 10/1999 | Baba et al. |
| 5,977,243 A * | 11/1999 | Barthel et al. |

FOREIGN PATENT DOCUMENTS

| | | |
|---|---|---|
| DE | 38 39 900 A1 | 5/1990 |
| EP | 0 109 508 A1 | 9/1983 |
| JP | 10139890 * | 5/1998 |

OTHER PUBLICATIONS

Patent Abstracts of Japan, vol. 1999, N. 08 (Jun. 30, 1999) JP11 060779A (Arai Pump Mfg. Co. Ltd.).

The English Derwent Abstract AN 1984–134984 (22).

* cited by examiner

*Primary Examiner*—Margaret G. Moore
*Assistant Examiner*—Marc S. Zimmer
(74) *Attorney, Agent, or Firm*—Brooks & Kushman P.C.

(57) ABSTRACT

Organopolysiloxane compositions prepared from an organopolysiloxane and a crosslinking agent comprising bis-4-methylbenzoyl peroxide (PMBP) and at least one compound from the group consisting of benzoyl peroxide, dicumyl peroxide, 2,5-dimethyl-hexane-2,5-di-tert-butyl peroxide (DHBP) and di-tert-butyl peroxide exhibit less tendency to yellow upon vulcanization, and can produce tear resistant, substantially odor free vulcanizates.

17 Claims, No Drawings

COMBINATION CROSSLINKING AGENT FOR VULCANIZATION OF SILICONE RUBBER UNDER NORMAL PRESSURE

TECHNICAL FIELD

The invention relates to crosslinkable organopolysiloxane compositions and to a process for the preparation thereof.

BACKGROUND ART

Only 2,4-dichlorobenzoyl peroxide (U.S. Pat. No. 4,260, 536) and para-methylbenzyl peroxide are currently suitable for crosslinking of silicone rubber extrudates under normal pressure. Both peroxides have disadvantages. Thus, 2,4-dichlorobenzoyl peroxide forms cleavage products which are in some cases toxic, and para-methylbenzyl peroxide leads to a severe odor nuisance, the rate of vulcanization is slow, and transparent vulcanization products can have a slight yellow coloration.

DISCLOSURE OF INVENTION

The object of the invention is to overcome the disadvantages of the prior art, in particular to achieve a rapid crosslinking without an odor nuisance and yellow coloration. The object is achieved by the invention, which employs specific mixtures of crosslinking agents.

BEST MODE FOR CARRYING OUT THE INVENTION

The invention relates to organopolysiloxane compositions which can be prepared from an organopolysiloxane and a crosslinking agent comprising bis-4-methylbenzoyl peroxide ("PMBP") and at least one compound from the group consisting of benzoyl peroxide, dicumyl peroxide, 2,5-dimethyl-hexane-2,5-di-tert-butyl peroxide ("DHBP") and di-tert-butyl peroxide.

Organopolysiloxanes which can be used are all the organopolysiloxanes which can be crosslinked peroxidically, preferably organopolysiloxanes (A) of units of the general formula

$$R_r SiO_{\frac{4-r}{2}} \qquad (I)$$

in which
R can be identical or different and is an optionally substituted hydrocarbon radical and
r is 0, 1, 2 or 3 and has an average numerical value of 1.9 to 2.1.

Examples of hydrocarbon radicals R are alkyl radicals such as the methyl, ethyl, n-propyl, isopropyl, n-butyl, isobutyl-, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and iso-octyl radicals, such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl and cycloheptyl radicals and methylcyclohexyl radicals; aryl radicals such as the phenyl, biphenyl, naphthyl and anthryl and phenanthryl radicals; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted hydrocarbon radicals R are halogenated alkyl radicals, such as the 3-chloropropyl, the 3,3,3-trifluoropropyl and the perfluorohexylethyl radical, and halogenated aryl radicals, such as the p-chlorophenyl and the p-chlorobenzyl radicals.

The radical R is preferably a hydrogen atom or a hydrocarbon radical having 1 to 8 carbon atoms, particularly preferably the methyl radical.

Further examples of radicals R are the vinyl, allyl, methallyl, 1-propenyl, 1-butenyl, 1-pentenyl, 5-hexenyl, butadienyl, hexadienyl, cyclopentenyl, cyclopentadienyl, cyclohexenyl, ethynyl, propargyl and 1-propynyl radicals. Preferred unsaturated radicals R are alkenyl radicals having 2 to 8 carbon atoms, particularly preferably the vinyl radical.

In the case of optionally substituted hydrocarbon radicals having 1 to 8 carbon atoms, the methyl, vinyl, phenyl and 3,3,3-trifluoropropyl radicals are particularly preferred.

Preferably, alkyl radicals, in particular methyl radicals, are bonded to at least 70 mol % of the Si atoms contained in the organopolysiloxane (A) of units of the formula (I). If the organopolysiloxanes also contain Si-bonded vinyl and/or phenyl radicals, in addition to Si-bonded methyl and/or 3,3,3-trifluoropropyl radicals, the total amount of vinyl and/or phenyl radicals is preferably 0.001–30 mol %.

The organopolysiloxanes (A) preferably predominantly comprise diorganosiloxane units. The end groups of the organopolysiloxanes can be trialkylsiloxy groups, in particular the trimethylsiloxy radical or the dimethylvinylsiloxy radical; however, one or more of these terminal alkyl groups can also be replaced by hydroxyl groups, or by alkoxy groups such as methoxy or ethoxy radicals.

The organopolysiloxanes (A) can be liquids or highly viscous substances. The organopolysiloxanes (A) preferably have a viscosity at 25° C. of between $10^3$ and $10^8$ mm$^2$/s.

The crosslinking agent used is preferably a mixture of bis-4-methylbenzoyl peroxide (PMBP) and at least one compound from the group consisting of benzoyl peroxide, dicumyl peroxide, 2,5-dimethyl-hexane-2,5-di-tert-butyl peroxide (DHBP), and di-tert-butyl peroxide in a weight ratio of 1:0.3 to 1:1, preferably in a ratio of about 1:0.8. If at least two compounds from the group consisting of benzoyl peroxide, dicumyl peroxide, 2,5-dimethyl-hexane-2,5-di-tert-butyl peroxide (DHBP) and di-tert-butyl peroxide are used, these can be used in any desired mixing ratios in the context of the weight ratio first mentioned. In this case, however, mixtures of equal parts by weight of the compounds from the group consisting of benzoyl peroxide, dicumyl peroxide, 2,5-dimethyl-hexane-2,5-di-tert-butyl peroxide (DHBP) and di-tert-butyl peroxide are preferred, mixtures of benzoyl peroxide and 2,5-dimethyl-hexane-2,5-di-tert-butyl peroxide (DHBP) in a weight ratio of 1:1 being particularly preferred.

The organopolysiloxanes (A) according to the invention furthermore preferably comprise reinforcing and/or non-reinforcing fillers. Examples of reinforcing fillers are pyrogenic or precipitated silicic acid having BET surface areas of at least 50 m$^2$/g.

Silicic acid fillers can have a hydrophilic character or may be hydrophobicized by known processes. In this context, reference is made, for example to DE-38 39 900 A (Wacker-Chemie GmbH; filed on Nov. 25, 1988) and the corresponding U.S. Pat. No. 5,057,151. In general, the hydrophobization is then carried out with 1 to 20% by weight of hexamethyldisilazane and/or divinyltetramethyldisilizane and 0.5 to 5% by weight of water, in each case based on the total weight of the organopolysiloxane composition, these reagents advantageously being added to the organopolysiloxane (A) which have already been initially introduced into a suitable mixing device, such as, for example, a kneader or internal mixer, before the hydrophilic silicic acid is incorporated subsequently into the composition.

Examples of non-reinforcing fillers are quartz flour, diatomaceous earth, calcium silicate, zirconium silicate, zeolites, metal oxide powders, such as aluminum, titanium, iron or zinc oxide, barium silicate, barium sulfate, calcium carbonate, gypsum and powders of plastics, such as polyacrylonitrile powder or polytetrafluoroethylene powder. Fibrous components, such as glass fibers and synthetic fibers, can furthermore be employed as fillers. The BET surface area of these fillers is preferably 50 $m^2/g$.

The organopolysiloxane compositions according to the invention, which can be crosslinked to elastomers, comprise filler (B) in amounts of preferably 1 to 200 parts by weight, particularly preferably 30 to 100 parts by weight, in each case based on 100 parts by weight of organopolysiloxane (A).

Additives (C) include processing auxiliaries such as plasticizers, pigments, and stabilizers, for example, heat stabilizers. Additives (C) can be added when necessary to the organopolysiloxane compositions vulcanizable to elastomers, depending on the particular use contemplated for the elastomer product. Non-limiting examples of plasticizers which can be employed as additives (C) include polydimethylsiloxanes which have terminal trimethylsilyl groups or hydroxyl groups and have a viscosity of not more than 1000 $mm^2/s$ at 25° C., and diphenylsilanediol. Non-limiting examples of heat stabilizers which can be employed as additives (C) include transition metal salts of fatty acids such as iron octoate, transition metal silanolates such as iron silanolate, and cerium(IV) compounds. The compositions according to the invention moreover preferably contain no further substances apart from coloring pigments, other than those just described. The particular components employed for the preparation of the compositions according to the invention can in each case be a single component of a given type, or a mixture of at least two components of the same type.

The invention also relates to a process for the preparation of organopolysiloxane compositions which comprises mixing an organopolysiloxane and a crosslinking agent comprising bis-4-methylbenzoyl peroxide (PBMP) and at least one compound from the group consisting of benzoyl peroxide, dicumyl peroxide, 2,5-dimethyl-hexane-2,5-di-tert-butyl peroxide (DHBP) and di-tert-butyl peroxide, preferably in a ratio of 1:0.3 to 1:1. The organopolysiloxane is preferably organopolysiloxane (A), which has the same meaning as above.

The organopolysiloxane compositions according to the invention which can be crosslinked peroxidically can be prepared by known processes, for example by simply mixing the individual components. The low molecular weight organosilicon compounds employed according to the invention can be incorporated here in various ways of admixing, for example in any desired step of the mixing of the individual components of the silicone rubber composition. For preparation of the compositions according to the invention which can be crosslinked peroxidically, the low molecular weight organosilicon compounds are advantageously mixed into the composition during the incorporation of the filler. Another possibility is to apply the low molecular weight organosilicon compound employed according to the invention onto the filler by mixing in a powder mixer or by mixing in a suspension of filler, inert organic solvent and low molecular weight organosilicon compound, and then stripping off the organic solvent to dryness, to be incorporated subsequently with this in the same way with the filler as a carrier. Another possibility comprises producing the low molecular weight organosilicon compound employed according to the invention on the filler by chemical reaction, for example analogously to process variant 2 described above.

The peroxidically crosslinkable compositions of the instant invention may be crosslinked under the same conditions as those described in the prior art.

The compositions according to the invention which can be crosslinked peroxidically have the advantage that the elastomers prepared therefrom show very good mechanical properties, in particular with respect to tear propagation resistance. Furthermore, the crosslinked products show no yellow coloration and do not cause an odor nuisance.

The organopolysiloxane compositions according to the invention and the elastomers prepared therefrom according to the invention can be employed for all the purposes for which organopolysiloxane compositions which can be crosslinked to elastomers or elastomers have been used to date. In particular, the organopolysiloxane compositions according to the invention and the elastomers prepared therefrom according to the invention are suitable for applications which require improved tear propagation resistance, such as, for example, hoses, cable sheathings, motor vehicle components and seals.

EXAMPLE 1

100 parts of a diorganopolysiloxane terminally blocked by trimethylsiloxy groups, and containing 99.93 mol percent of dimethylsiloxane units, 0.07 mol percent of vinylmethylsiloxane units, and having a viscosity of $8 \cdot 10^6$ mPa·s at 25° C. are mixed in a kneader maintained at 150° C., first with 50 parts of silicon dioxide produced pyrogenically in the gas phase and having a surface area of 200 $m^2/g$, next with 1 part of dimethylpolysiloxane terminally blocked by trimethylsiloxy groups and having a viscosity of 96 mPa·s at 25° C., and finally with 7 parts of a dimethylpolysiloxane containing terminal Si-bonded hydroxyl groups and having a viscosity of 40 mPa·s at 25° C. For crosslinking, a mixture of 1% by weight of bis-4-methylbenzoyl peroxide (PMBP) and 0.8% by weight of benzoyl peroxide is blended in.

EXAMPLE 2

100 parts of a diorganopolysiloxane terminally blocked by trimethylsiloxy groups, and containing 99.93 mol percent of dimethylsiloxane units, 0.07 mol percent of vinylmethylsiloxane units, and having a viscosity of $8 \cdot 10^6$ mPa·s at 25° C. are mixed in a kneader maintained at 150° C., first with 50 parts of silicon dioxide produced pyrogenically in the gas phase and having a surface area of 200 $m^2/g$, next with 1 part of dimethylpolysiloxane terminally blocked by trimethylsiloxy groups and having a viscosity of 96 mPa·s at 25° C., and finally with 7 parts of a dimethylpolysiloxane containing terminal Si-bonded hydroxyl groups and having a viscosity of 40 mPa·s at 25° C. For crosslinking, a mixture of 1% by weight of bis-4-methylbenzoyl peroxide (PMBP) and 0.8% by weight of a mixture of equal parts of benzoyl peroxide and 2,5-dimethylhexane-2,5-di-tert-butyl peroxide (DHBP) is blended in.

COMPARISON EXAMPLE 1

The procedure described in Examples 1 and 2 is repeated, with the modification that only 1.5% by weight of PMBP is blended in as the crosslinking agent.

COMPARISON EXAMPLE 2

The procedure described in Example 1 is repeated, with the modification that only 1.5% by weight of benzoyl peroxide is blended in as the crosslinking agent.

COMPARISON EXAMPLE 3

The procedure described in Example 2 is repeated, with the modification that only a mixture of 1.5% by weight of benzoyl peroxide and 2,5-dimethyl-hexane-2,5-di-tert-butyl peroxide (DHBP) is blended in as the crosslinking agent.

An electrical conductor (stranded wire, 1.5 mm$^2$ diameter) is insulated with the aid of extrusion using the composition according to Examples 1 and 2 and comparison mixtures 1, 2 and 3. The wall thickness of the insulation is 0.6 mm. An extruder with a screw of 45/10 d with a crosshead die is used for this purpose. The temperature of the heating zone is 470° C. at the intake, 350° C. in the middle and 250° C. at the end. The take-off speed is 20 m/min. The residence time in the heating zone is 20 seconds.

Result
Cable According to Examples 1 and 2
Bubble-free, completely crosslinked insulation, only slight odor, negligible yellow coloration of the insulation.
Cable According to Comparison Example 1
Slightly under-crosslinked insulation, in places slight bubble formation, severe odor, yellow coloration of the insulation. For adequate crosslinking, it is necessary to prolong the residence time to 25 seconds.
Cable According to Comparison Examples 2 and 3
Insulation with bubble formation, tacky surface, no odor nuisance, no yellow coloration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An organopolysiloxane composition comprising a peridoxically crosslinkable organopolysiloxane and a crosslinking agent comprising bis-4-methylbenzoyl peroxide and at least one compound selected from the group consisting of benzoyl peroxide, dicumyl peroxide, 2,5-dimethyl-hexane-2,5-di-tert-butyl peroxide, and di-tert-butyl peroxide in a weight ratio of 1:0.3 to 1:1.

2. An organopolysiloxane composition as claimed in claim 1, wherein said crosslinking agent comprises bis-4-methylbenzoyl peroxide and at least one compound selected from the group consisting of benzoyl peroxide, dicumyl peroxide, 2,5-dimethyl-hexane-2,5-di-tert-butyl peroxide and di-tert-butyl peroxide in a weight ratio of 1:0.8 to 1:1.

3. A process for the preparation of a crosslinkable organopolysiloxane composition, which comprises mixing a peroxidically crosslinkable organopolysiloxane and a crosslinking agent comprising bis-4-methylbenzoyl peroxide and at least one compound selected from the group consisting of benzoyl peroxide, dicumyl peroxide, 2,5-dimethyl-hexane-2,5-di-tert-butyl peroxide, and di-tert-butyl peroxide in a weight ratio from 1:0.3 to 1:1.

4. The process for the preparation of an organopolysiloxane composition as claimed in claim 3, wherein said crosslinking agent comprises bis-4-methylbenzoyl peroxide and compound selected from the group consisting of benzoyl peroxide, dicumyl peroxide, 2,5-dimethyl-hexane-2,5-di-tert-butyl peroxide, and di-tert-butyl peroxide in a weight ratio of 1:0.8 to 1:1.

5. A crosslinked organopolysiloxane elastomer comprising the crosslinked product of a peridoxically crosslinkable organopolysiloxane and a crosslinking agent comprising bis-4-methylbenzoyl peroxide and at least one compound selected from the group consisting of benzoyl peroxide, dicumyl peroxide, 2,5-dimethyl-hexane-2,5-di-tert-butyl peroxide, and di-tert-butyl peroxide in a weight ratio of 1:0.3 to 1:1.

6. The peroxidically crosslinked organopolysiloxane elastomer of claim 5 in the form of an insulation sheath surrounding one or more wire conductors.

7. The composition of claim 1 wherein at least a portion of said peroxidically crosslinkable organopolysiloxane comprises organopolysiloxanes bearing at least one alkenyl radical having from 2 to 8 carbon atoms.

8. The composition of claim 2 wherein at least a portion of said peroxidically crosslinkable organopolysiloxane comprises organopolysiloxanes bearing at least one alkenyl radical having from 2 to 8 carbon atoms.

9. The process of claim 3 wherein at least a portion of said peroxidically crosslinkable organopolysiloxane comprises organopolysiloxanes bearing at least one alkenyl radical having from 2 to 8 carbon atoms.

10. The process of claim 4 wherein at least a portion of said peroxidically crosslinkable organopolysiloxane comprises organopolysiloxanes bearing at least one alkenyl radical having from 2 to 8 carbon atoms.

11. The composition of claim 5 wherein at least a portion of said peroxidically crosslinkable organopolysiloxane comprises organopolysiloxanes bearing at least one alkenyl radical having from 2 to 8 carbon atoms.

12. A bubble-free organopolysiloxane elastomer, comprising the cured product of an organopolysiloxane composition comprising a peridoxically crosslinkable organopolysiloxane and a crosslinking agent comprising bis-4-methylbenzoyl peroxide and at least one compound selected from the group consisting of benzoyl peroxide, dicumyl peroxide, 2,5-dimethyl-hexane-2,5-di-tert-butyl peroxide, and di-tert-butyl peroxide.

13. An organopolysiloxane composition comprising an unsaturated group-containing organopolysiloxane and a crosslinking agent comprising bis-4-methylbenzoyl peroxide and at least one compound selected from the group consisting of benzoyl peroxide, dicumyl peroxide, 2,5-dimethyl-hexane-2,5-di-tert-butyl peroxide, and di-tert-butyl peroxide.

14. The composition of claim 1, wherein said crosslinking agent comprises bis-4-methylbenzoylperoxide and at least one compound selected from the group consisting of dicumyl peroxide, 2,5-dimethyl-hexane-2,5-di-tert-butyl peroxide, and di-tert-butyl peroxide.

15. The composition of claim 1 wherein at least two of benzoyl peroxide, dicumyl peroxide, 2,5-dimethyl-hexane-2,5-di-tert-butyl peroxide, and di-tert-butyl peroxide are present.

16. The composition of claim 1 wherein at least one organopolysiloxane has a viscosity at 25° C. of from $10^3$ mm$^2$/s to $10^8$ mm$^2$/s.

17. The composition of claim 1 wherein at least one organopolysiloxane has a viscosity at 25° C. of from $8\times10^6$ mm2/s to $10^8$ mm$^2$/s.

* * * * *